United States Patent [19]

Kilb

[11] Patent Number: 5,803,933
[45] Date of Patent: Sep. 8, 1998

[54] PROCESS FOR THE PRODCUTION OF PRISMATIC ALKALINE ACCUMULATOR CELLS

[75] Inventor: Manfred Kilb, Franfurt am Main, Germany

[73] Assignee: Christoph Emmerich GmbH & Co. KG, Franfurt am Main, Germany

[21] Appl. No.: 755,934

[22] Filed: Nov. 25, 1996

[30] Foreign Application Priority Data

Nov. 25, 1995 [DE] Germany .................. 195 44 050.1

[51] Int. Cl.$^6$ ..................................... H01M 6/00
[52] U.S. Cl. ................. 29/623.1; 29/623.5; 429/163; 429/175
[58] Field of Search ................ 29/623.1, 623.5; 429/233, 241, 245, 175, 163

[56] References Cited

U.S. PATENT DOCUMENTS

| | | | |
|---|---|---|---|
| 4,878,521 | 11/1989 | Fredrickson | 29/623.1 |
| 5,323,527 | 6/1994 | Ribordy et al. | 29/623.1 |
| 5,552,244 | 9/1996 | Griffin et al. | 29/623.1 |
| 5,558,679 | 9/1996 | Tuttle | 29/623.1 |

*Primary Examiner*—Bruce F. Bell

[57] ABSTRACT

A process for the production of prismatic alkaline accumulator cells of rectangular cross-section, wherein firstly an electrode unit comprising positive and negative electrodes with interposed separators and a cover of plastic material is produced. The cover has a feed through arrangement and connecting contacts for the electrodes. After the casing of the plastic material is filled with a measured amount of electrolyte, the electrode unit is lowered step wise and with pauses into the casing in such a way that the dry electrode pack can become fully impregnated by absorption without electrolyte issuing from the casing. When the cover is then fitted on the casing, the two parts are welded together to afford absolute sealing integrity. In order to reduce possible, even high increased pressure due to improper handling the cover contains a shaped recess, a rubber pin that covers over a bore in the cover leading into the interior of the casing, and a plastic ball that is pressed into the recess in the cover and fixes the rubber pin in place. In the event of a slightly increased pressure, the rubber pin first lifts off the bore and allows gas to escape to the exterior. In the event of a very high and sudden increase in pressure, the rubber pin and the ball are thrown out.

11 Claims, 2 Drawing Sheets

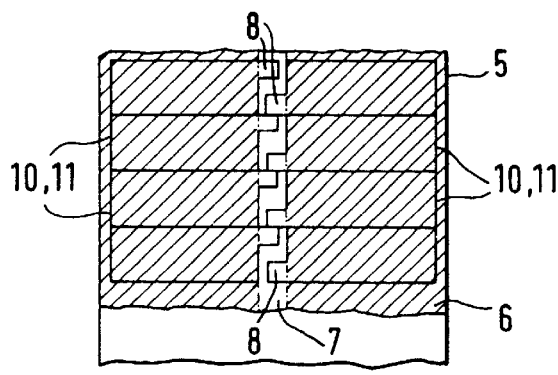
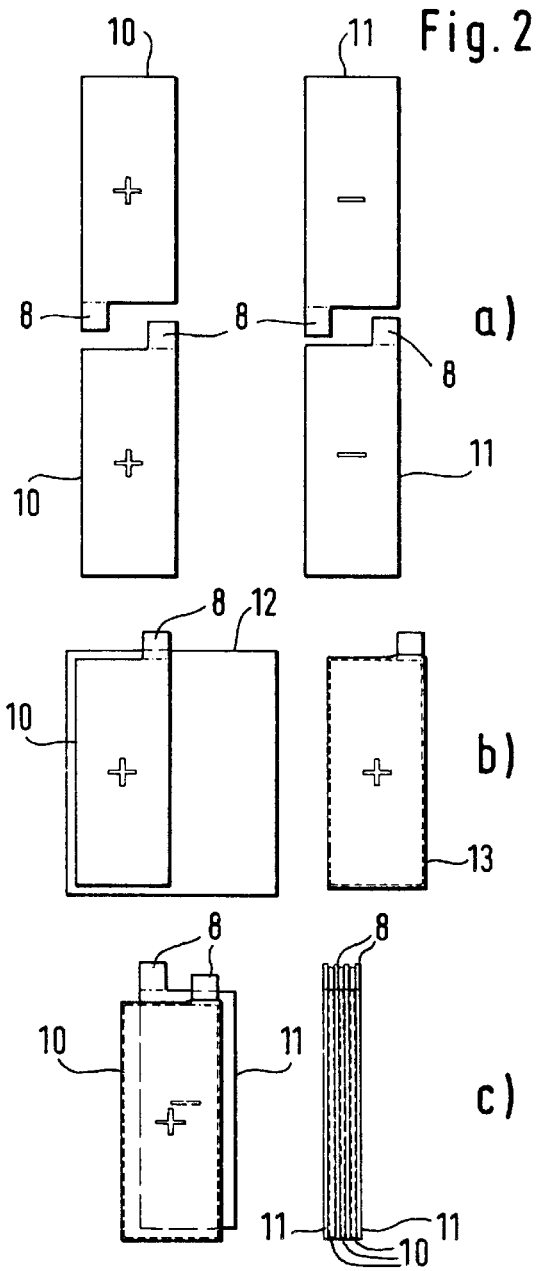
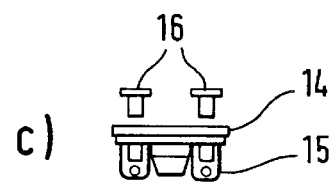
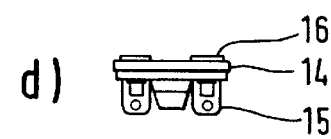
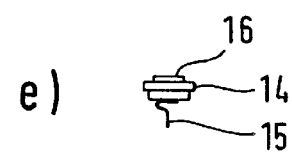
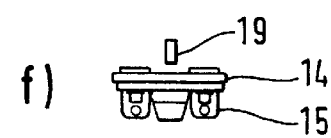
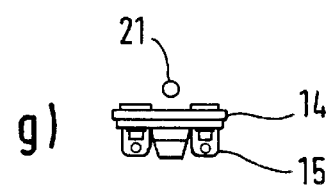
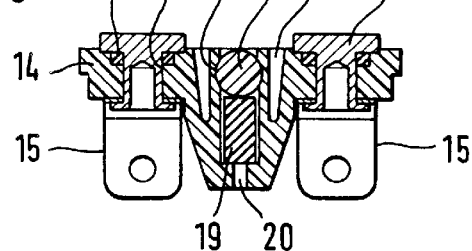

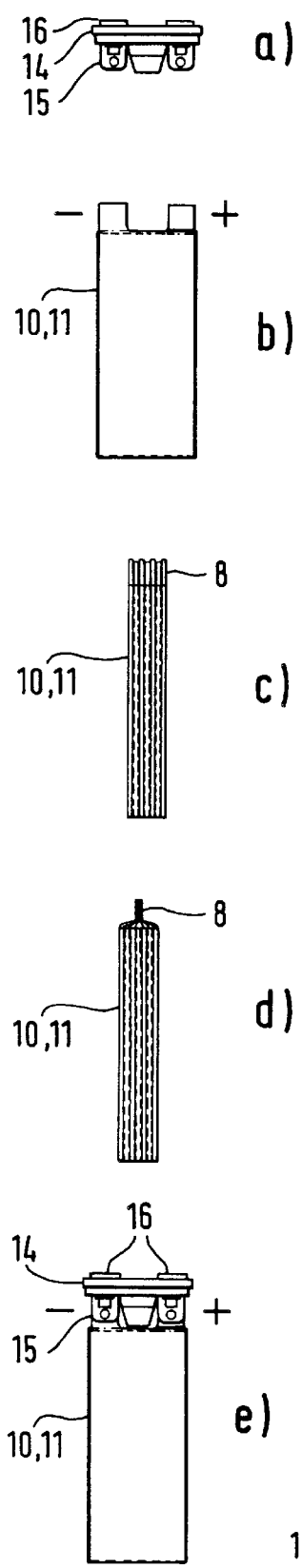
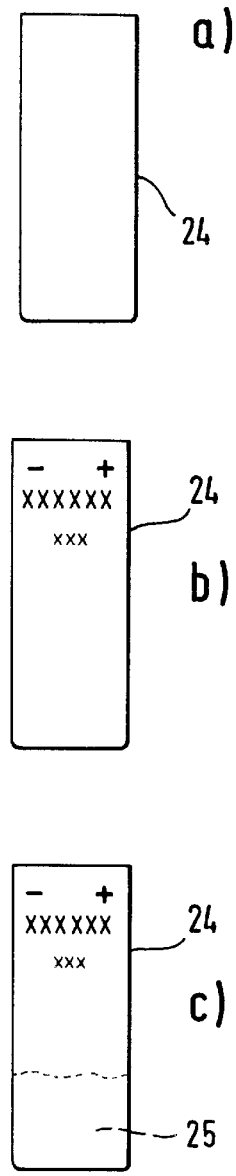
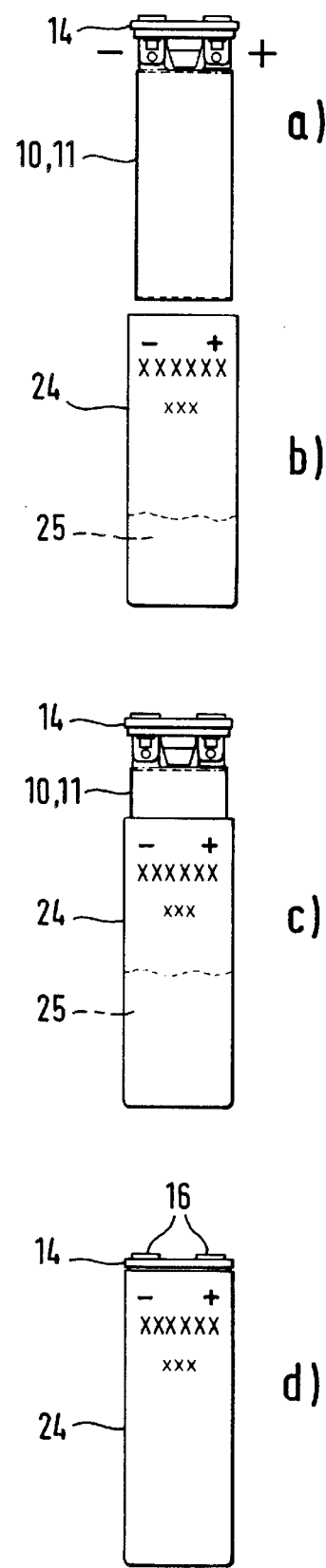

PROCESS FOR THE PRODCUTION OF PRISMATIC ALKALINE ACCUMULATOR CELLS

BACKGROUND OF THE INVENTION

FIELD OF THE INVENTION

This invention relates to a process for producing prismatic alkaline accumulator cells, and more particularly, to an alkaline accumulator cell of rectangular cross-section.

Prismatic accumulators of a rectangular cross-section and in a specific case also of square cross-section make use of the available structural volume in items of equipment to a substantially better degree than cylindrical round cells which always require free spaces, even when most densely packed. An advantage with round cells however is that the electrodes can be wound from strip portions with an interposed separator. Such a procedure cannot be used for completely filling a rectangular cross-section, right into the corners thereof. In contrast, the operation of stacking electrodes of a rectangular configuration, with the interpositioning of separators, is an expensive one, more specifically also because of the connections to the individual electrodes which then have to be connected in parallel in pairs for the positive and the negative electrodes respectively. A further difficulty in the case of prismatic cells of rectangular cross-section lies in the connection between the casing for the electrodes and a closure cover which must have feed-through means for connection to the electrodes. That applies in particular when, in accordance with the state of the art, the casing and also the cover comprise a surface-treated steel sheet or a sheet of another material. The connection between the cover and the casing must not only be mechanically stable but, because of the aggressive alkaline electrodes, it must also afford absolute sealing integrity. In addition, a safety valve is to be arranged in the casing, which valve responds in the event of improper charging or discharging of the cell and any inadmissible rise in temperature which occurs in that situation, and an increase in pressure in the interior of the cell. Additional requirements concern the capacity of the prismatic cells being as high as possible, while being of minimum possible weight, and in particular cycle times which are as short as possible in production of the cells in order to achieve low cost levels.

SUMMARY OF THE INVENTION

The object of the invention is to provide a process for the production of such prismatic alkaline cells of rectangular cross-section, which overcomes the above-discussed difficulties and satisfies the requirements referred to.

This object is achieved by a process including the steps of producing an electrode unit with strips of nickel fleece or nickel foam, producing a cover of plastic material for the cells, finishing the electrode unit, including pressing connecting strips to positive and negative electrodes, and supplying a prismatic plastic casing filling the casing with electrolyte, lowering the electrode unit into the casing and welding the cover of the electrode unit to the casing.

The use of a strip comprising nickel fleece or nickel foam makes it possible on the one hand to reliably and easily introduce the active material by pasting. In that operation very long strips can be processed on an automatic production line which not only effects selective pasting of the strips but also effects division of the strip into electrodes, including disengaging the strip portion or portions which has or have not been coated (pasted), to produce the connecting strip portions. The same applies in regard to drying and calendering the strip to the desired thickness. In that case it is possible to achieve very short cycle times. The same production line can be used for producing the positive and the negative electrodes. For that purpose it is only necessary to change over the respective coating material. It is however also possible to set up two parallel production lines.

The operation of alternately coating positive and negative electrodes with the interposition of separators can also be effected in an automatic installation with short cycle times. The same applies to the method steps for producing the covers from plastic material and for production of the electrode units, with welding of the positive and negative connecting strip portions respectively to the delivery or distribution conductors on the inside of the covers.

The use of plastic casings makes it possible to achieve a very sound and sealing connection between the casing and its cover by welding. At the same time the use of plastic material for the casing and the cover provides for low weight and therefore a high capacity relative to the weight of the cell. Filling the casing with a measured amount of electrolyte and the subsequent stepwise downward movement of the electrode packs, which are not pre-impregnated, is particularly advantageous for the reason that there is no need for special steps for handling electrolyte-impregnated components. If the filling and lowering operations are correctly performed, the area around the cells, that is to say both the automatic devices which are used for carrying out the steps involved and also the operating personnel, do not come into contact with the aggressive electrolyte.

Thus, as already mentioned, process steps (1) to (4) can be carried out in a continuous process by automatic apparatuses. That makes it possible to manufacture large numbers of items per unit of time, that is to say that makes it possible to achieve very short cycle times. Desirably the separators disposed between the positive and the negative electrodes can be produced by a procedure whereby the positive electrodes are driven into a separator portion, leaving the connecting strip portions free, so that the electrodes lie in a pocket formed thereby. The edges of the pocket, which adjoin at the three sides of the electrode, are then welded. That ensures that, even if the electrodes of a stack are not precisely aligned, direct contact can be achieved between the positive and negative electrodes.

In the operation of coating or pasting the fleece or foam strip, a strip portion is advantageously kept free of active material, in the longitudinal centre of the strip. In that case, arranged on each of the two sides of the central strip portion are respective electrodes, the connecting strip portions of which are displaced relative to each other after disengagement of the interposed strip portion material, so that only a small amount of waste is produced. If necessary a plurality of structures of that kind can be arranged on a strip so that two or more pairs of electrodes can be produced at the same time.

After the electrodes are laid one on to the other, the electrode pack is desirably pressed to a defined thickness so that it can later be inserted into a casing without difficulty.

A cover produced in accordance with the process is distinguished in that the rivets are arranged with the interposition of a seal which is disposed in an annular groove in the cover, between the rivet head which serves as the connecting contact, and the cover. In the operation of riveting the delivery conductors to the cover, contact feed-through means are then produced, which afford absolute sealing integrity so that no electrolyte can pass through to the exterior. The safety valve is advantageously a rubber pin of circular cross-section, which is arranged in a matching cylindrical portion of the shaped recess, and a plastic ball which is pressed from the outside of the cover into a groove or channel in the shaped recess, thereby bearing against an end face of the rubber pin. In addition, a passage goes from the cylindrical portion of the shaped recess to the inside of the cover so that, after the rubber pin is lifted off its seat at the inside, upon an increase in pressure, gas or liquid can issue. If there is a very high rise in pressure, the ball can additionally be flung outwardly out of its seat by way of the rubber pin.

BRIEF DESCRIPTION OF THE DRAWINGS

An embodiment of the process according to the invention is described hereinafter with reference to the drawings in which:

FIG. 1 diagrammatically shows a portion of a strip of nickel fleece or nickel foam with electrodes indicated thereon, FIG. 2 shows process steps a), b) and c) for the production of an electrode pack, FIG. 3 shows process steps a) to g) for the production of a cover, FIG. 4 is a view on an enlarged scale in cross-section of a finished cover as the result of the process steps shown in FIG. 3, FIG. 5 shows process steps a) to e) for the production of an electrode unit, FIG. 5f shows a side view on an enlarged scale of part of the electrode unit as the result of process step e) in FIG. 5, FIG. 6 shows process steps a), b) and c) for preparing and stamping a plastic casing and filling it with electrolyte, and FIG. 7 shows process steps a) to d) for finishing the accumulator cell.

DESCRIPTION OF THE PREFERRED EMBODIMENTS

For the purposes of production of the positive and negative electrodes 10 and 11 respectively for a prismatic alkaline accumulator cell of rectangular cross-section, the basic starting material used is a strip 5 of nickel foam which is coated with an active material for positive and negative electrodes respectively in an automatic production line. As shown by hatching in FIG. 1, the coating operation is effected in such a way that a central longitudinal strip portion 7 remains free. The nickel foam of the strip portion 7 serves to produce the connecting strip portions 8 for the electrodes 10 and 11 respectively. The nickel foam of a strip for positive electrodes has for example a porosity of 80 ppi (pores per inch) and a strip for negative electrodes has for example a porosity of 60 ppi. The coating material for the positive electrodes is in per se known manner spherical nickel hydroxide of a grain size of up to 150 Mu and a hardness of about 3 to 4 Mohs. The coating material for the negative electrode is for example a metal hydride alloy (rare earths La—Ce 30–40%, nickel 50–60%, Mn—Al 5–10%) of a grain size of up to 150 mu and a hardness of about Hrc 55.

After the operation of coating a negative and a positive electrode strip 5 respectively, various steps then follow in an automatic installation for production of the strip, for example drying of the coating material, calendering to a predetermined thickness, possibly a cutting trimming operation etc. The electrodes 10 and 11 respectively are then stamped out. In that operation, the central strip portion material 7 between the connecting strip portions 8 is also disengaged. that then gives the electrodes as illustrated in FIG. 2a.

As shown in FIG. 2b, the positive electrodes 10 are then wound into a rectangular portion 12 of a separator material. The electrode 10 lies on the material 12 at the left in FIG. 2b. The right-hand part of the portion is then folded over on the right as shown in FIG. 2b and then welded at the edges which lie one upon the other. The electrodes 10 are then securely disposed in a pocket or pouch 10, with the connecting strip portion 8 projecting outwardly and remaining free.

The electrodes 10, 11, as shown in FIG. 2c, are then superposed in coincident relationship (for reasons of improved clarity, the positive electrodes 10 are displaced relative to the negative electrodes 11 at the left in FIG. 2c). In that situation the connecting strip portions 8 are disposed on opposite ends of the electrode end face.

For production of an electrode unit (see FIGS. 5e and 5f) comprising a cover and an electrode pack as shown in FIG. 2c, firstly the cover is produced, with its associated parts, in an automatic installation, in accordance with the diagrammatic view in FIG. 3. Electrode delivery conductors 15 are fitted into a cover 14 injection-moulded from plastic material, on the inside of the cover. A more accurate view of the individual parts is to be found in the enlarged sectional view shown in FIG. 4. Rivets 16 are then fitted through bores 17 (see FIG. 4) in the cover 14 and corresponding bores in the angled electrode conductors 15. As shown in FIG. 3d, the cover 14 is thereby finished, with the feed-through means formed by the conductors 15 and the rivets 16, and the heads of the rivets 16 as connecting contacts.

For clearly illustrating the structure involved FIG. 3e once again shows a side view of part of the angled conductor 15, the cover 14 and the rivets 16.

For safety reasons it is necessary for such an alkaline cell to be provided with a safety valve in order to prevent bursting as a result of an increased internal pressure in the event of improper handling. For that purpose the cover 14 has a substantially cylindrical shaped recess 18 with projections and hollows therein. A rubber pin 19 is firstly introduced into the shaped recess 18, as shown in FIG. 3f, the rubber pin 19 closing a passage 20 which leads to the inside of the cell. The rubber pin 19 is held in place by a plastic ball 21 which is pressed into an opening (edge groove) of the recess 18 and latched therein. So that the walls of the recess 18 can yield when the plastic ball 21 is pressed in, the recess 18 is surrounded by a peripherally extending clearance 22.

In the event that an increased internal pressure occurs in the cell, the rubber pin 19 is firstly lifted off its seat so that gas can escape to the exterior through the passage 20 and lateral grooves (not shown) in the recess 18.

As FIG. 4 also shows the heads of the rivets 16 are fixed on the cover 14 with the interposition of respective annular seals 23.

As shown in FIGS. 5a and 5b, a cover 14 is then assembled to an electrode pack as shown in FIG. 2c or FIGS. 5b and 5c. Then, as FIG. 5d shows, the positive and negative connecting strip portions 8 are pressed together so that they can be spot-welded to the electrode conductors 15, as shown in FIG. 5e. This can be particularly clearly seen in FIG. 5f.

A casing 24 comprising plastic material (FIG. 6a) is supplied for the purposes of finishing the cell. The plastic material used for the casing 24 is preferably a thermoplastic elastomer, in particular a modified polyamide, a styrene-ethylene-butylene-styrene copolymer, and/or a polypropylene, while glass or carbon fibres can be embedded into the plastic material. As shown in FIG. 6b the housing 24 receives a stamping which contains for example the name of the manufacturer and technical data. Thereafter the casing is filled with a given amount of electrolyte 25 which is ascertained empirically, as shown in FIG. 6c. Thereafter the dry electrode unit as shown in FIGS. 5e and 5f is slowly lowered into the casing 24 until it cones into contact with the electrolyte 25. According to the progress upon absorption of the electrolyte by the electrode unit, the electrode unit is then pushed into the casing 24 in a plurality of steps and with interposed pauses. When then the cover 14 lies on the casing 24 as shown in FIG. 7d both parts can be welded together so as to afford absolute sealing integrity. The number of steps and intermediate pauses is so determined empirically that on the one hand the final condition as shown in FIG. 7d is reached as quickly as possible but on the other hand no electrolyte issues from the housing 24 during the insertion of the electrode unit.

A high-speed formating procedure is then effected for subsequently testing and possibly rejecting any defective cells. In that operation for example cells with a capacity of 600 mAh are charged for 2.5 seconds at 600 mA. If the cell voltage is then within a window of 1.5 volt to 1.6 volt, the cells are deemed to be good, whereas if not, they are deemed to be bad. The bad cells are then rejected.

I claim:

1. A process for the production of prismatic alkaline accumulator cells of rectangular cross-section, characterised by the following process steps:
   (1) production of an electrode unit with the following process steps:
      a) supplying a strip (5) of nickel fleece or nickel foam,
      b) pasting the strip (5) with the active material for positive and negative electrodes (10, 11) respectively, leaving free one or more strip portions (7) which are in the region of the later electrode connectors (8),
      c) drying and calendering the strip (5) to the desired thickness,
      d) dividing the strip (5) into electrodes (10, 11) of the desired width and partial disengagement of the strip portion or portions (7) without active material, in such a way that a connecting strip portion (8) remains at an electrode edge, and
      e) alternate superimposition in coincident relationship of positive and negative electrodes (10, 11), with the interposition of respective separators (12), in such a way that the connecting strip portions (8) of the positive and negative electrodes (10, 11) are respectively separatedly disposed in superposed relationship and an electrode pack is produced,
   (2) producing covers (14) of plastic material with connecting contacts (16) for the cells comprising the following process steps:
      a) supplying covers (14) of plastic material which each have two bores (17) for the connecting contacts (16),
      b) inserting rivets (16) as connecting contacts into the bores (17) in the covers,
      c) fitting electrode delivery conductors (15) which are each provided with a bore on to the free ends of the rivets (16),
      d) initial shaping and final shaping of the rivets (16) for fixing the electrode conductors (15) on the inside of the covers (14) and thus producing an electrolyte-tight feedthrough means through the covers (14), and
      e) inserting and fixing a safety valve (19, 21) in a central shaped recess (18) in the cover (14),
   (3) finishing the electrode unit comprising the following process steps:
      a) pressing the connecting strip portions (8) together to the positive and negative electrodes (10, 11) respectively of a pack, and
      b) spot-welding of the pressed-together connecting strip portions (8) to the electrode conductors (15) on the inside of the cover (14), and
   (4) finishing the cell comprising the following process steps:
      a) supplying a prismatic plastic casing (24) which is open at one end for closure with a cover (14) in accordance with (2),
      b) filling a casing (24) with a measured amount of electrolyte (25),
      c) lowering the electrode pack of an electrode unit into the casing (24) in a plurality of steps which are separated in respect of time,
      d) welding the cover (14) of the electrode unit to the casing (24),
      e) high-speed formating of the cell in a test station, and
      f) sorting out failed cells on the basis of the values in the high-speed formating operation.

2. A process according to claim 1 characterised in that process steps (1) to (4) are performed in a continuous process by automatic apparatuses.

3. A process according to claim 1 characterised in that in process step (1) d) the disengagement step is effected prior to the separation step.

4. A process according to claim 1 characterised in that the operation of superimposing the electrodes (10, 11) in accordance with step (1) e) is effected in an apparatus having an aligning recess corresponding to the electrode shape.

5. A process according to claim 1 characterised in that the separators which in accordance with step (1) e) lie between the positive and negative electrodes (10, 11) are produced by the following steps:
   a) driving the positive electrodes (10) into a separator portion (12), leaving free the connecting strip portions (8) and forming a pocket (13),
   b) welding the edges of the pocket (13), which meet each other at the three sides of the electrodes.

6. A process according to claim 1 characterised in that in process step (1) b) a strip portion (7) remains free of active material in the longitudinal centre of the strip (5) and arranged on each side of the central strip portion (7) are respective electrodes (10, 11) whose connecting strip portions (8) are displaced relative to each other.

7. A process according to claim 1 characterised in that prior to process step (3) a) the electrode pack is pressed to a defined thickness.

8. A process according to claim 1 characterised in that the rivets (16) are introduced with the interposition of a seal (23) disposed in an annular groove in the cover, between the rivet head which serves as the connecting contact, and the cover (14).

9. A process according to claim 8 characterised in that the safety valve has a rubber pin (19) arranged in a cylindrical portion of the shaped recess (18) and adapted thereto in respect of diameter, and a plastic ball (21) which is pressed from the outside of the cover (14), bearing against an end face of the rubber pin (19), in a groove in the shaped recess (18), and that a passage leads to the inside of the cover (14) from the cylindrical portion of the shaped recess (18).

10. A cover of plastic material for prismatic alkaline accumulator cells, said cover having two bores (17) and a central shaped recess (18), comprising:

rivets (16) having rivet heads and serving as connecting contacts, fitted into said two bores (17), electrode delivery conductors (15) fixed on the inside of said cover and connected to free ends of said rivets (16), thus producing an electrolyte-tight feed through means through said cover, a safety valve (19, 21) in said central shaped recess (18), and a seal (23) disposed in an annular groove in said cover between said rivet heads and said cover.

11. A cover according to claim 10, wherein said central shaped recess has a cylindrical portion and a groove, and said safety valve (19, 21) comprises a rubber pin (19) arranged in said cylindrical portion of said central shaped recess (18) and having a diameter that fits within said central shaped recess (18), and a plastic ball (21) that is pressed from outside said cover and bears against an end-face of said rubber pin (19) in said groove in said central shaped recess (18), and said cover has a passage leading from said cylindrical portion of said central shaped recess (18) to the inside of said cover.

* * * * *